(12) United States Patent
Mishra et al.

(10) Patent No.: US 12,405,600 B2
(45) Date of Patent: Sep. 2, 2025

(54) SAFETY INSTRUMENTED SYSTEM INTERFACE

(71) Applicant: Schneider Electric Systems USA, Inc., Foxboro, MA (US)

(72) Inventors: Ajay Mishra, Irvine, CA (US); Diana Ivanov, Rancho Santa Margarita, CA (US); Erna Banchik, Rancho Santa Margarita, CA (US); Karpagam Chockalingam, Mission Viejo, CA (US)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 393 days.

(21) Appl. No.: 17/032,844

(22) Filed: Sep. 25, 2020

(65) Prior Publication Data

US 2022/0100180 A1 Mar. 31, 2022

(51) Int. Cl.
*G05B 19/418* (2006.01)
*G06F 16/68* (2019.01)
(Continued)

(52) U.S. Cl.
CPC ... *G05B 19/41865* (2013.01); *G05B 19/4183* (2013.01); *G05B 19/41885* (2013.01);
(Continued)

(58) Field of Classification Search
CPC ............ G05B 19/4183; G05B 19/0428; G06F 16/90332; G06F 16/9035
See application file for complete search history.

(56) References Cited

U.S. PATENT DOCUMENTS 9,582,376 B2 2/2017 Gabler et al.
12,099,935 B2 * 9/2024 Okuno ..................... G06N 5/02
(Continued)

FOREIGN PATENT DOCUMENTS

EP 3451616 A1 3/2019
WO 2018152053 A1 8/2018

OTHER PUBLICATIONS

European Search Report, European Application No. 21197400.1, dated Feb. 16, 2022, 12 pages.

*Primary Examiner* — Kris E Mackes
(74) *Attorney, Agent, or Firm* — Stinson LLP

(57) ABSTRACT

Dual layer interface with a safety instrumented system (SIS) in an industrial plant. A diagnostic status aggregator having an established connection with the SIS collects and stores health and diagnostic status data from the SIS. An interface processing engine communicatively coupled to the diagnostic status aggregator and to a user device receives a new request for information relating to the SIS from the user device. A memory stores processor-executable instructions that, when executed, configure the interface processing engine for parsing the new request to identify one or more specific keywords therein associated with the requested information relating to the SIS, generating a query based on the identified keywords, retrieving, from the diagnostic status aggregator, the status data collected from the SIS responsive to the query, and providing, the status data retrieved from the diagnostic status aggregator to the user device.

20 Claims, 3 Drawing Sheets

(51) Int. Cl.
*G06F 16/9032* (2019.01)
*G06F 16/9035* (2019.01)
*G06F 16/9038* (2019.01)
*G06F 40/205* (2020.01)

(52) U.S. Cl.
CPC ...... *G06F 16/686* (2019.01); *G06F 16/90332* (2019.01); *G06F 16/9035* (2019.01); *G06F 16/9038* (2019.01); *G06F 40/205* (2020.01)

(56) References Cited

U.S. PATENT DOCUMENTS

| | | | |
|---|---|---|---|
| 2002/0112044 A1* | 8/2002 | Hessmer | H04L 69/329 709/223 |
| 2013/0110520 A1 | 5/2013 | Cheyer et al. | |
| 2015/0105887 A1* | 4/2015 | Troy | G05B 19/41865 700/97 |
| 2017/0068670 A1* | 3/2017 | Orr | H04N 21/41265 |
| 2017/0084167 A1* | 3/2017 | Bump | G06F 11/079 |
| 2017/0213155 A1* | 7/2017 | Hammond | G06F 8/31 |
| 2018/0357047 A1* | 12/2018 | Brown | G06F 18/2148 |
| 2018/0357334 A1* | 12/2018 | Chao | G05B 19/4185 |
| 2019/0026318 A1* | 1/2019 | Bertellotti | G06F 16/248 |
| 2019/0107827 A1* | 4/2019 | Dhakshinamoorthy | G05B 19/4183 |
| 2020/0117742 A1* | 4/2020 | Huang | G06F 16/24564 |
| 2020/0387147 A1* | 12/2020 | Nixon | G05B 19/4185 |
| 2021/0048798 A1* | 2/2021 | Bulanda | H04J 3/0661 |

\* cited by examiner

SAFETY INSTRUMENTED SYSTEM INTERFACE

BACKGROUND

In a process control system, fault tolerance enables continued operation in the event components within the system fail, or in the event the system experiences transient faults from various sources. One aspect common to fault tolerant systems involves the concept of redundancy, which can be simply defined as back up components that become operational when a failure occurs, allowing the system to continue to operate as intended. Safety instrumented systems (SIS), such as Triconex® safety controllers and the like available from Schneider Electric Systems USA, Inc., are known in the art for continuing operation in a "safe state" to avoid adverse safety and health consequences through the use of a fault tolerant controller. Such fault tolerant controllers are often used in hazard protection systems (i.e., systems that regulate nuclear plant operation, turbomachinery, fire and gas sensing systems, and the like).

The safety demands on control systems vary by industry and application. While all must generally maintain operational parameters within desired ranges over time, control systems employed in industries such as oil & gas, chemical, and power additionally insure that controlled systems and subsystems avoid reaching states that might lead to hazard within the plant and/or its environs (e.g., fire, explosion, hazardous materials release, equipment destruction, human injury or loss of life, etc.). A typical SIS installed in the process is programmed to identify an impending highly critical unsafe event and respond immediately to drive the process to a safe condition. This is typically done independently from the process control system, but may at times be coordinated with the process control system. At the same time, these "safety systems" are expected to provide high availability while avoiding false trips that might lead system or subsystem shut-down (or operational down-regulation) in response to false sensor readings and/or when safety is not truly at risk. Field devices, controllers, workstations and other apparatus supporting preferred such safety systems are manufactured and sold by the assignee hereof under its Triconex® brand label, among others.

SUMMARY

Briefly, aspects of the present disclosure provide efficient monitoring of safety systems by making information available to an end user from any location via a dual interface layer. The dual interface layer does not directly interact with the SIS, which ensures security and safety when processing information requests. In operation, the user uses a mobile device, such as a smartphone, to request access to the desired information by speech or text.

Aspects of the present disclosure further provide enhanced interaction between the user and the safety system through remote maintenance capability, such as a handheld app, chat-bot, and voice-based interface with natural voice processing. For geo-location based requests, equipment can be identified externally by including a machine-readable code, which can be read by the mobile device). The statuses of the safety system are shared using a unidirectional interface for information flow such that the remote access components do not direct interact with the SIS. Instead there is dual layer for interaction.

In an aspect, a method for interfacing with at least one SIS in an industrial plant comprises receiving, from a user device via an interface processing engine, a new request for information relating to the SIS. The user device is communicatively coupled to the interface processing engine and the interface processing engine is communicatively coupled to a diagnostic status aggregator. The diagnostic status aggregator has an established connection with the SIS and stores at least one of health and diagnostic status data collected from the SIS. The method further comprises parsing the new request to identify one or more specific keywords therein associated with the requested information relating to the SIS, generating a query based on the identified keywords, retrieving the status data collected from the SIS responsive to the query, and providing the status data retrieved from the diagnostic status aggregator to the user device.

In another aspect, a dual layer interface with a SIS includes a diagnostic status aggregator having an established connection with the SIS that collects and stores health and diagnostic status data from the SIS. An interface processing engine communicatively coupled to the diagnostic status aggregator and to a user device receives a new request for information relating to the SIS from the user device. A memory stores processor-executable instructions that, when executed, configure the interface processing engine for parsing the new request to identify one or more specific keywords therein associated with the requested information relating to the SIS, generating a query based on the identified keywords, retrieving, from the diagnostic status aggregator, the status data collected from the SIS responsive to the query, and providing, the status data retrieved from the diagnostic status aggregator to the user device.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
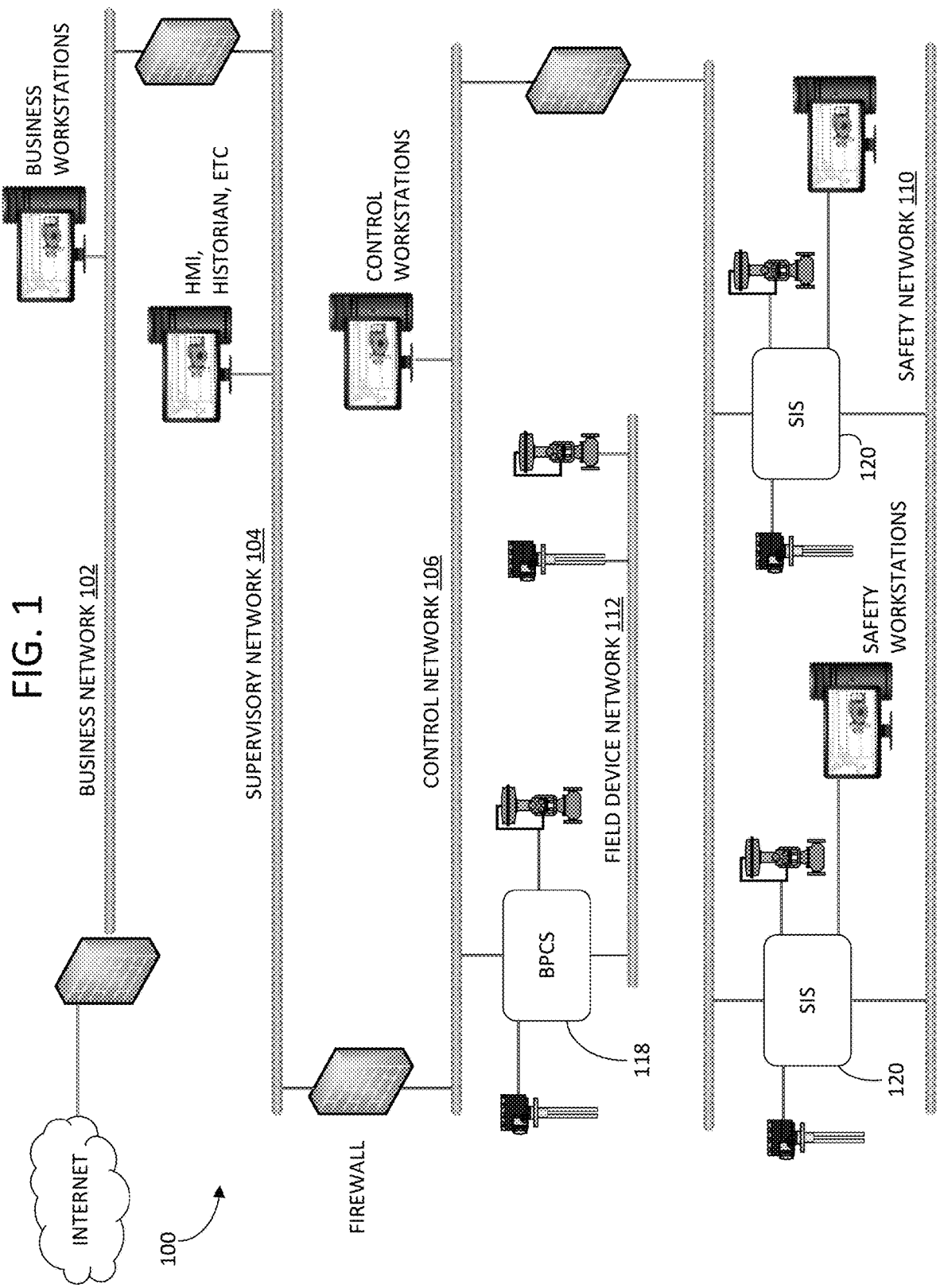
FIG. 1 is a process control network architecture according to an embodiment.

FIG. 1 illustrates aspects of a plant network 100 in the form of an example process control network architecture. As shown, the plant network 100 is segmented into multiple zones, such as a business network 102, a supervisory network 104, and a control network 106. In the illustrated embodiment, the control network 106 provides real time control to devices or equipment that communicate on either a safety network 110 or a non-safety network (e.g., a field device network 112). One or more firewalls 114 separate each zone of plant network 100.

The control network 106 carries process control device communications to a basic process control system (BPCS) 118. In turn, the BPCS 118, which is coupled to the field device network 112, interacts with field devices and other I/O devices, their controllers, and the like.

The safety network 110 includes at least one safety system 120, such as a safety instrumented system (SIS). As described above, the safety system 120 is configured to drive the process to a safe condition when unsafe Referring now to FIG. 2, safety system 120 is a key protection layer to prevent industrial accidents in a plant.

The safety system 120 comprises at least one safety programmable logic controller (PLC) main processor module 202 and at least one safety PLC input/output (IO) module 204. As shown, the main processor module 202 may be housed in a main chassis and the IO module 204 may be housed in a separate, remote IO chassis. In an embodiment, components of safety system 120 may be may be located in a control room or distributed across a plant. The safety PLC main processor module 202 and safety PLC IO module 204 in the embodiment of FIG. 2 are distributed remotely (e.g., up to 70 kilometers) from each other.

End users (e.g., asset owners, plant maintenance personnel) often operate and maintain safety systems 120 for many years during the operation of an industrial plant. A plant's maintenance personnel typically perform daily heath monitoring and reporting of the health status of the plant's safety systems 120. In addition, when a component of safety system 120 fails, the plant operator must alert the plant's maintenance personnel to perform repairs. The maintenance personnel typically use a maintenance software to perform a primary maintenance function by determining which component of safety system 120 has failed in order to perform online repair by replacing the failed component. In some instances, the plant maintenance personnel require support and must first collect information relating to the failure for providing to the safety system vendor.

Aspects of the present disclosure provide efficient monitoring of safety systems 120 by making information available to a user 206 from any location via a dual interface layer comprised of an interface processing engine 210 and a diagnostic status aggregator 212. As shown in FIG. 2, the user 206 uses a mobile device 214, such as a smartphone, to request access to the desired information by speech or text. For example, user 206 simply asks the mobile device 214 via traditional means, chats, or natural voice (e.g., "What is the overall status of the safety systems?"). The mobile device 214 executes a mobile application 216 that provides a speech/text interface by which user 206 can request information regarding safety system 120. The speech/text interface of the mobile application 216 sends queries from text or natural voice to the interface processing engine 210 based on voice commands from user 206.

Figure 2:
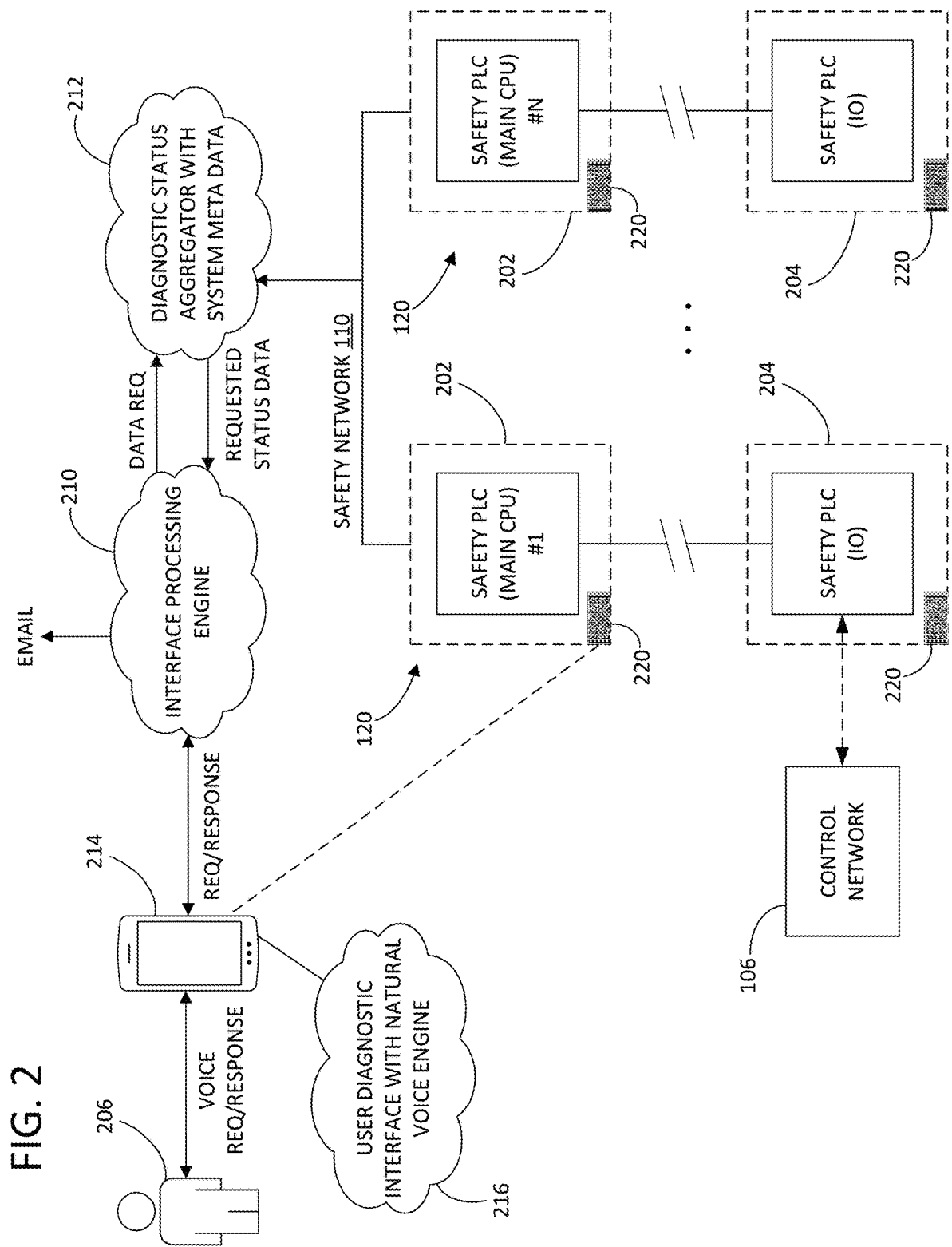
FIG. 2 is a block diagram of a safety instrumented system interface according to an embodiment.

Referring further to FIG. 2, the diagnostic status aggregator 212, embodied by cloud data storage, for example, collects live status information indicating the health of safety system 120. The collected status information is preferably coupled with system metadata (e.g., area, equipment, safety instrumented function (SIF), predefined room/site location, etc.). This represents a one-way collection of data from safety system 120. The statuses of safety system 120 are shared using a unidirectional interface for information flow such that the remote access components do not direct interact with safety system 120. Instead there is dual layer for interaction. The interface processing engine 210 is configured to send requests to and receive responses from diagnostic status aggregator 212.

For security reasons, there is no direct or indirect interaction between user 206 or interface processing engine 210 and safety system 120. Moreover, coupling metadata with the status information for safety system 120 provides a higher level of confidence that the interaction is safe and secure and an improved natural workflow and productivity.

Figure 3:
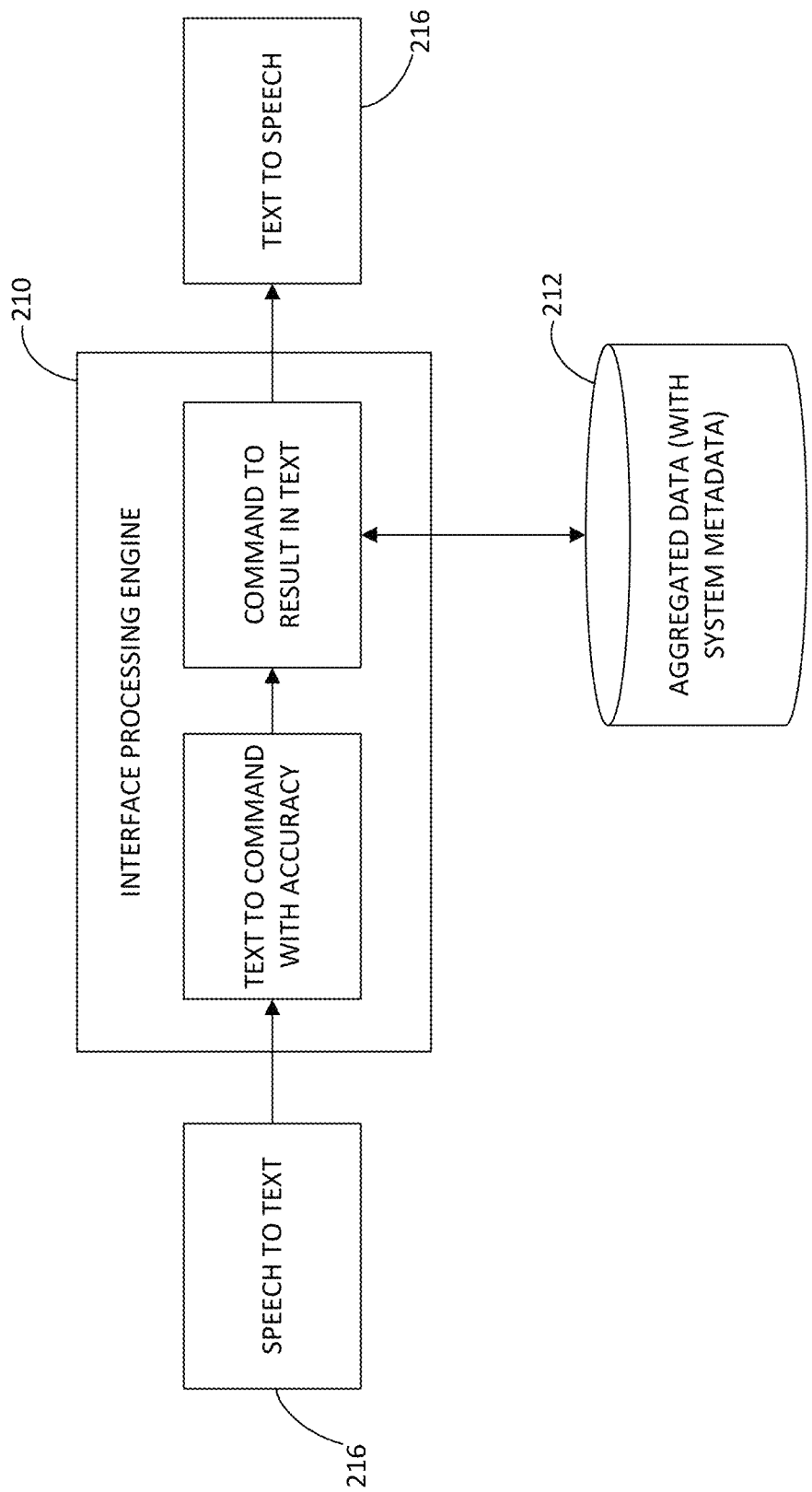
FIG. 3 is a block diagram of an interface processing engine of the interface of FIG. 2.

As shown in FIG. 3, mobile application 216 provides a speech-to-text interface by which user 206 can request information regarding safety system 120. The mobile application 216 sends a query converted from natural voice to text to interface processing engine 210. In an embodiment, interface processing engine 210 uses artificial intelligence or machine learning to determine what information is to be retrieved and in what context based on the text query. The interface processing engine 210 accesses a database of questions/intents related to safety systems 120 referenced to specific keywords and executes machine learning or artificial intelligence to train for a given set of system configurations for user 206 and to parse user requests and to recognize a set of questions/intents related to safety system 120 of interest using the specific keywords and their variations. For example, the trained interface processing engine 210 determines if the new request corresponds to or is related to a previous request related to the safety system 120 by comparing the new request to previous requests using specific keywords and their variants. As a result, interface processing engine 210 can accurately formulate the proper contextual query and determine the correct command from user 206. In an alternative embodiment, interface processing engine 210 additionally requests confirmation of the determined command from user 206. The interface processing engine 210 then communicates the command to diagnostic status aggregator 212 for retrieving the requested information. In an embodiment, mobile application 216 converts the retrieved status information from text to natural voice for user 206.

Referring again to FIG. 2, aspects of the present disclosure further provide enhanced interaction between user 206 and safety system 120 through remote maintenance capability, such as a handheld app, chat-bot, and voice-based interface with natural voice processing executed on mobile device 214. For geo-location based requests, equipment can be identified externally by including a machine-readable code 220, which can be read by mobile device 214. FIG. 2 illustrates a unique, individual, scannable machine-readable code 220 applied or affixed to the main chassis of safety PLC main processor module 202 and/or the IO chassis of safety PLC IO module 204. The machine-readable code 220 may be one or more of: a QR (quick response) 2-dimensional bar code; a data matrix 2-dimensional bar code; an RFID tag or code; a unique pattern or graphic that can be uniquely identified (e.g., a picture of a person identifiable by facial recognition software); an infrared code; a linear bar code; and/or other scannable identification markings, either visible or not visible within the visible light spectrum. In this manner, the dual interface layer does not directly interact with safety system 120, which ensures security and safety when processing information requests.

The mobile device 214 executes mobile application to 216 scan machine-readable code 220 from the chassis of a selected safety PLC module 202, 204 of interest. In an embodiment, the scanned code 220 identifies the location and/or context of the selected safety PLC module 202, 204. In another embodiment, in addition to or instead of code scanning, mobile device 214 executes mobile application 216 to provide a speech/text interface by which user 206 can request information regarding safety system 120. As described above, the speech/text interface sends queries from text or natural voice to interface processing engine 210 based on voice commands from user 206.

The following are example use cases in which diagnostic status aggregator 212 continuously collects health and diagnostic status information from safety systems 120. The natural voice questions used in the examples are illustrative and it is contemplated that end users 206 will ask variations of these questions or different questions using natural language.

Use Case #1: Finding Overall Status of Safety Systems 120 from a Remote Location.

The user 206 asks in natural voice, "What is the overall status?" The application 216 executed on mobile device 214 translates the natural voice question to text and sends the text query to interface processing engine 210 for processing. The interface processing engine 210 determines the best match to the query and sends a data request to diagnostic data aggregator 212 to retrieve the requested information. The diagnostic data aggregator 212 sends the requested data back to interface processing engine 210. In turn, interface processing engine 210 assembles the response in a correct contextual format and sends it back to mobile device 214, which executes mobile application 216 to convert the response to natural voice for user 206. In an alternative embodiment, mobile device 214 displays the information from interface processing engine 210 in a text format. The dual interface layer for processing the request eliminates direct interactions between user 206 and safety system 120 thus ensuring security and safety. Moreover, contextual notifications to user 206 upon failure will improve productivity.

Use Case #2: Finding Status of Specific Component of Safety System 120.

Using mobile device 214, user 206 scans machine-readable code 220 on the outside of a selected one of the main chassis of safety PLC main processor module 202 and the IO chassis of safety PLC IO module 204 of interest to obtain identification information. The user 206 then asks using natural voice via application 216 executing on mobile device 214, "What has failed?" The mobile application 216 translates the natural voice request to text and sends the text query to interface processing engine 210 along with the machine-readable identification obtained from the specific safety system 120. The interface processing engine 210 determines the best match to the voice request and sends a data request to diagnostic data aggregator 212 for the status information corresponding to the identified system component. The diagnostic data aggregator 212 sends back the requested data to interface processing engine 210, which assembles the response in a correct contextual format and sends the response to mobile device 214. In turn, interface processing engine 210 assembles the response in a correct contextual format and sends it back to mobile device 214, which executes mobile application 216 to convert the response to natural voice for user 206. In an alternative embodiment, mobile device 214 displays the information from interface processing engine 210 in a text format.

Use Case #3: Contacting Customer Support.

At the end of use case #2, above, user 206 may decide to seek help from a third party (e.g., a supplier of the safety system 120). The user 206 instructs in natural voice, "Contact customer support." The application 216 executed on mobile device 214 translates the natural voice instruction to text and sends the specific user request/message to customer support along with the machine-readable identification 220 to interface processing engine 210. The interface processing engine 210 collects the relevant information from diagnostic data aggregator 212, compiles the collected information with the user request/message, and sends the information and request to customer support by email. Advantageously, aspects of the present disclosure improve the efficiency of maintenance requests to supplier customer support by facilitating the contact along with relevant failure information from safety system 120.

Commonly assigned U.S. Pat. No. 9,582,376, the entire contents of which are incorporated herein by reference, discloses a fault tolerant controller allowing for the flexible communication between safety instrumented systems that implement the aforementioned "safe state." Networked control devices, e.g., in addition to actuators and sensors, include one or more controllers that monitor and control respective aspects of the process, as modified in accord with the teachings hereof. The controllers can comprise mainframe computers, workstations, personal computers, special-purpose hardware, or other digital data processing apparatus capable of performing monitoring and control functions. Controllers may be operated in a manner known in the art, as modified by the teachings hereof. Preferred controllers are constructed and operated in the manner of the control processors ("CP") commercially available from the assignee hereof, such as Triconex® (a/k/a "Tricon") and Trident™ controllers.

Embodiments of the present disclosure may comprise a special purpose computer including a variety of computer hardware, as described in greater detail below.

For purposes of illustration, programs and other executable program components may be shown as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method for interfacing with at least one safety instrumented system (SIS) in an industrial plant, the industrial plant comprising a plurality of equipment configured for communicating with the SIS, the method comprising:

establishing a unidirectional connection from the SIS to a diagnostic status aggregator, the SIS configured for supplying at least one of health and diagnostic status data to the diagnostic status aggregator via the unidirectional connection, the diagnostic status aggregator storing the status data supplied by the SIS;

communicatively coupling an interface processing engine to the diagnostic status aggregator, the interface processing engine configured for communicating with a remote user device configured to be located at a plurality of remote locations associated with the plurality of equipment of the industrial plant, the interface processing engine and the diagnostic status aggregator comprising a dual interface layer, wherein the unidirectional connection from the SIS to the diagnostic status aggregator of the dual interface layer prevents the user device from directly interacting with the SIS;

receiving, via a mobile application of the user device, a new request for information relating to the SIS, wherein the user device is configured for generating the new request from the plurality of remote locations;

receiving, by the interface processing engine, the new request from the user device, the user device communicatively coupled to the interface processing engine;

executing at least one of an artificial intelligence system and a machine learning algorithm to train the interface processing engine to recognize one or more specific keywords associated with the requested information relating to the SIS;

parsing, by the interface processing engine, the new request to identify one or more specific keywords therein associated with the requested information relating to the SIS, wherein identification of the one or more specific keywords is performed by the interface processing engine trained by the at least one of an artificial intelligence system and a machine learning algorithm;

generating, by the interface processing engine, a query based on the identified keywords;

retrieving, by the interface processing engine from the diagnostic status aggregator, the status data supplied by the SIS to the diagnostic aggregator responsive to the query; and providing, by the interface processing engine, the status data retrieved from the diagnostic status aggregator to the user device.

2. The method of claim 1, wherein the diagnostic status aggregator is configured to continuously collect the health and diagnostic status data from the SIS.

3. The method of claim 1, wherein parsing the new request comprises determining if the new request corresponds to one or more previous requests related to the SIS by comparing the new request to the one or more previous requests using the specific keywords and variants thereof.

4. The method of claim 3, wherein retrieving the status data the SIS comprises retrieving, in response to determining the new request corresponds to the one or more previous requests, the status data based, at least in part, on information learned from the one or more previous requests.

5. The method of claim 4, further comprising:
in response to determining the new request does not correspond to the one or more previous requests, retrieving, by the interface processing engine from the diagnostic status aggregator, the status data supplied by the SIS responsive to the query; and
using information relating to the new request and the status data retrieved from the diagnostic status aggregator to train the interface processing engine.

6. The method of claim 3, wherein determining if the new request corresponds to the one or more previous requests comprises training the interface processing engine.

7. The method of claim 1, wherein receiving the new request from the user device comprises executing a speech-to-text application to convert the new request in natural speech to a text-based request.

8. The method of claim 1, wherein the status data is stored by the diagnostic status aggregator in connection with metadata relating to the SIS from which the status data is collected.

9. The method of claim 8, wherein the metadata comprises at least one of the following: a location of the SIS; an identifier of the SIS; and a safety instrumented function (SIF) associated with the SIS.

10. The method of claim 1, further comprising:
receiving, from the mobile application of the user device by the interface processing engine, an identifier associated with the SIS, the identifier obtained by the user device by scanning a machine-readable code associated with the SIS.

11. A system comprising:
at least one safety instrumented system (SIS) in an industrial plant, the industrial plant comprising a plurality of equipment configured for communicating with the SIS;
a diagnostic status aggregator communicatively coupled to the SIS via a unidirectional connection established from the SIS to the diagnostic status aggregator, the diagnostic status aggregator configured to collect at least one of health and diagnostic status data from the SIS and to store the collected status data, wherein the SIS has the unidirectional established connection to the diagnostic status aggregator for supplying the status data thereto;
a mobile application running on a remote user device, the remote user device configured to be located at a plurality of remote locations associated with the plurality of equipment of the industrial plant, the mobile application configured to generate a new request for information relating to the SIS from the plurality of remote locations;
an interface processing engine communicatively coupled to the diagnostic status aggregator and to the remote user device, the interface processing engine configured to receive the new request from the user device, the interface processing engine and the diagnostic status aggregator comprising a dual interface layer, wherein the unidirectional connection from the SIS to the diagnostic status aggregator of the dual interface layer prevents the user device from directly interacting with the SIS; and
a memory storage device storing processor-executable instructions that, when executed, further configure the interface processing engine for:
executing at least one of an artificial intelligence system and a machine learning algorithm to train the interface processing engine to recognize one or more specific keywords associated with the requested information relating to the SIS;
parsing the new request to identify the one or more specific keywords therein associated with the requested information relating to the SIS, wherein identification of the one or more specific keywords is performed by the interface processing engine trained by the at least one an artificial intelligence system and a machine learning algorithm;
generating a query based on the identified keywords;
retrieving, from the diagnostic status aggregator, the status data supplied by the SIS to the diagnostic aggregator responsive to the query; and
providing, the status data retrieved from the diagnostic status aggregator to the user device.

12. The system of claim 11, wherein the diagnostic status aggregator is configured to continuously collect the health and diagnostic status data from the SIS.

13. The system of claim 11, wherein parsing the new request comprises determining if the new request corresponds to one or more previous requests related to the SIS by comparing the new request to the one or more previous requests using the specific keywords and variants thereof.

14. The system of claim 13, wherein retrieving the status data supplied by the SIS comprises retrieving, in response to determining the new request corresponds to the one or more previous requests, the status data based, at least in part, on information learned from the one or more previous requests.

15. The system of claim 14, wherein the memory storage device stores processor-executable instructions that, when executed, further configure the interface processing engine for:
in response to determining the new request does not correspond to the one or more previous requests, retrieving, by the interface processing engine from the diagnostic status aggregator, the status data supplied by the SIS responsive to the query; and
using information relating to the new request and the status data retrieved from the diagnostic status aggregator to train the interface processing engine.

16. The system of claim 13, wherein determining if the new request corresponds to the one or more previous requests comprises training the interface processing engine.

17. The system of claim 11, wherein user devices is configured to execute a speech-to-text application to convert the new request in natural speech to a text-based request and wherein new request received by the interface processing engine is the text-based request.

18. The system of claim 11, wherein the status data is stored by the diagnostic status aggregator in connection with metadata relating to the SIS from which the status data is collected.

19. The system of claim 18, wherein the metadata comprises at least one of the following: a location of the SIS; an identifier of the SIS; and a safety instrumented function (SIF) associated with the SIS.

20. The system of claim 11, further comprising a machine-readable code associated with the SIS, wherein the interface processing engine is configured to receive, from the mobile application of the user device, an identifier associated with the SIS obtained by the user device by scanning the machine-readable code.

\* \* \* \* \*